United States Patent

Wu et al.

[11] Patent Number: 5,730,423
[45] Date of Patent: Mar. 24, 1998

[54] ALL METAL DIAPHRAGM VALVE

[75] Inventors: Jing-Chau Wu, Morris Plains; Patrick P. Barber, Kinnelon; Lewis L. Aldridge, Parsippany, all of N.J.

[73] Assignee: Parker-Hannifin Corporation, Cleveland, Ohio

[21] Appl. No.: 731,517

[22] Filed: Oct. 16, 1996

[51] Int. Cl.⁶ .................................................. F16K 7/17
[52] U.S. Cl. .................................... 251/331; 251/368
[58] Field of Search ........................... 251/331, 368, 251/63.5

[56] References Cited

U.S. PATENT DOCUMENTS

| | | | |
|---|---|---|---|
| 4,828,219 | 5/1989 | Ohmi et al. | 251/331 X |
| 5,186,434 | 2/1993 | Nishimura et al. | 251/331 |
| 5,253,671 | 10/1993 | Kolenc | 251/331 X |
| 5,413,311 | 5/1995 | Arstein et al. | 251/331 |
| 5,485,984 | 1/1996 | Itoi et al. | 251/331 |

*Primary Examiner*—Kevin Lee
*Attorney, Agent, or Firm*—Anthony J. Casella; Gerald E. Hespos; Ludomir A. Budzyn

[57] ABSTRACT

An all metal diaphragm valve is provided. The valve includes a housing having an inlet passage and an outlet passage each of which communicates with a valve chamber. Portions of the inlet passage in the valve chamber are surrounded by a toroidal sealing bead. The valve further includes a resilient metallic diaphragm which is dished and in an unbiased condition projects away from the toroidal sealing bead. Thus, fluid may flow through the inlet passage, through the valve chamber and out of the outlet passage. Actuation of a valve stem will cause the metal diaphragm to deflect toward and into sealing engagement with the toroidal sealing bead. The surface of the diaphragm that engages the toroidal sealing bead is formed from a very hard metallic alloy However adjacent layers of the diaphragm are formed from softer metals.

9 Claims, 2 Drawing Sheets

ALL METAL DIAPHRAGM VALVE

BACKGROUND OF THE INVENTION

1. Field of the Invention

The subject invention relates to a diaphragm valve formed substantially from metallic materials to ensure purity of gas flowing therethrough.

2. Description of the Prior Art

The prior art diaphragm valve includes a valve housing formed with a valve chamber. Inlet and outlet passages extend through the valve housing and communicate with the valve chamber. A flexible diaphragm defines one wall of the prior art valve chamber, and is positioned opposite the entry of the inlet passage into the valve chamber.

The prior art diaphragm valve further includes a diaphragm actuator that communicates with the side of the diaphragm external of the valve chamber. The actuator may comprise a piston, a spring, pressurized fluid or some combination thereof. Forces exerted by the actuator cause the diaphragm to deflect into sealing engagement with portions of the valve housing surrounding the inlet passage to the valve chamber. Movement of the piston away from the valve chamber may move the diaphragm away from the inlet passage and may permit fluid to flow from the inlet passage, through the valve chamber and into the outlet passage. Some prior art diaphragm valves include a diaphragm that is biased into the opened position. Thus movement of the actuator away from the valve chamber may permit the inherent biasing of the diaphragm to open the inlet passages to the valve chamber.

Effective sealing is an important requirement for virtually all valves. Sealing typically is enhanced by utilizing an elastomeric or plastic material on one or both members defining a sealing interface. For example, some prior art diaphragm valves include an elastomeric diaphragm that can be urged into sealing engagement with a valve seat surrounding the entry of the inlet passage into the valve chamber. Other diaphragm valves may include an elastomeric or plastic valve seat surrounding the inlet passage and configured for engagement by the diaphragm. Elastomeric or plastic sealing members perform very well in many fluid flow valves, such as valves carrying water and valves carrying liquid chemicals that will react with metals.

Many industrial processes, such as processes performed in the semi-conductor and microprocessor industries, require the presence of high purity gas. The gases typically are produced at off-site locations, and are delivered to the appropriate manufacturing facility in pressurized containers. The containers then are placed into communication with piping systems for use as needed in the manufacturing facilities. Valves in the piping systems are used to periodically stop, start or control the flow of high purity gas.

Piping systems for carrying high purity gases at a manufacturing facility should be constructed to maintain the high purity of the gas delivered to the facility. In particular, all parts of the gas delivery system should be constructed from materials that prevent gas diffusion, moisture absorption and dimensional changes in response to certain gas exposure. Gas diffusion and moisture absorption are associated with many plastic and rubber materials. Additionally, certain plastics are known to swell upon exposure to certain gases. Still further, many plastics will degrade rapidly when exposed to high temperature gas flows. As a result, plastic or rubber gaskets and fittings that are suitable for many fluid flow applications typically are avoided in high purity gas flow systems.

To minimize diffusion of gas into and through plastic components and to minimize moisture absorption, many valves for high purity gas flow systems are provided with valve seats and/or valving members formed from plastics that substantially minimize these problems. For example, prior art diaphragm valves used in high purity gas flow systems may employ a metallic diaphragm and a PCTFE valve seat surrounding the inlet passage to the valve. PCTFE is known to provide very good sealing properties and to present minimal gas diffusion and moisture absorption problems. Although these diaphragm valves have worked fairly well in the past, there is a desire for even greater degrees of purity in the gases being carried. Accordingly, there is a desire to provide valves that are free of plastics, including the heretofore acceptable plastics such as PCTFE.

The simple removal of plastic components from prior art valves would eliminate problems associated with gas diffusion and moisture absorption. However, the industrial processes in which these valves are used must positively stop the flow of gases in the closed condition of the valve. Thus, engineers have been faced with a dichotomy. Prior art valves could be formed with at least some plastic components to provide effective sealing, but with the potential for gas diffusion and moisture absorption. Alternatively prior art valves could be formed without plastic components to avoid gas diffusion and moisture absorption, but with the near certainty for less than optimum sealing performance.

The prior art includes all metal valves that rely upon a significant wiping action between two members to be sealed. This wiping action occurs in some prior art valves as one planar surface is twisted into tight sealing engagement with a second planar surface having an inlet or outlet passage. In other prior art valves, the wiping occurs as a conical member is slid into a cylindrical opening. Wiping actions of this type invariably generate wear debris and cause particles to enter the gas stream. These particles significantly affect the purity of the gas and can adversely affect the manufacturing process being carried out in the presence of the gas.

In view of the above, it is an object of the subject invention to provide a valve that achieves effective sealing without adversely affecting purity of gas flow through the valve.

It is another object of the subject invention to provide an all metal diaphragm valve that enables efficient sealing.

It is a further object of the subject invention to provide an all metal valve that substantially eliminates particle generation.

An additional object is to provide a valve that can operate for extended periods of time in the presence of high temperature gases.

Still a further object of the subject invention is to provide a valve that is dimensionally stable in the presence of virtually all gases.

SUMMARY OF THE INVENTION

The subject invention is directed to a diaphragm valve that has only metallic components exposed to gases flowing therethrough. The diaphragm valve of the subject invention includes a valve housing having an open-sided valve chamber. Inlet and outlet passages extend through the valve housing and into the valve chamber. Portions of the metallic valve housing surrounding the entry of the inlet passage into the valve chamber define a toroidal sealing bead that is concentric with the inlet passage and that may be unitary with the valve housing.

The diaphragm valve of the subject invention further includes a metallic diaphragm defining a wall of the valve chamber. The metallic diaphragm may be juxtaposed to the toroidal sealing bead that surrounds the entry of the inlet passage to the valve chamber. Central portions of the metallic diaphragm may be of dished configuration. Dished portions of the diaphragm project away from the inlet passage to define the open condition of the valve. The dished shape of the diaphragm requires a longer stroke for closure of the valve, and hence effectively defines a larger valve chamber which can accommodate a greater gas flow. The dished shape also provides resiliency which permits the valve to be repeatedly opened as explained further herein.

The diaphragm valve of the subject invention further includes a valve stem engaging the side of the metallic diaphragm opposite the valve chamber. The valve stem may be movable axially to deflect the metallic diaphragm toward the inlet passage and into tight sealing engagement with the toroidal sealing bead at the entry of the inlet passage into the valve chamber. In particular, actuation of the valve stem causes the metallic diaphragm to achieve a circular line of sealing contact with the toroidal sealing bead. The circular line of contact enabled by the toroidal sealing bead achieves a high quality seal despite the absence of a plastic or rubber material on either of the interengaged surface defining the seal.

The diaphragm may be formed from a plurality of metal layers in stacked abutting relationship to one another. In particular, the diaphragm may include outer metallic layers formed from a hard metallic material that is not reactive to gases flowing through the valve. The hard metallic outer layers of the diaphragm may be sandwiched around at least one inner layer of a softer, more malleable metallic material. The hard metallic outer layers prevent the creation of wear debris after even a large number of valve actuations. Additionally, the hard metallic outer layers provide desirable resiliency for the diaphragm and ensure specified performance over a long life. The softer more malleable metal material between the outer layers permits a controlled deformation of the diaphragm for achieving a high quality seal between the diaphragm and the toroidal sealing bead. The outer layers of the diaphragm may be formed from a metal alloy having a hardness HRC greater than 40. Inner portions of the diaphragm may be formed from copper or silver plated copper.

DETAILED DESCRIPTION OF THE PREFERRED EMBODIMENT

Figure 1:
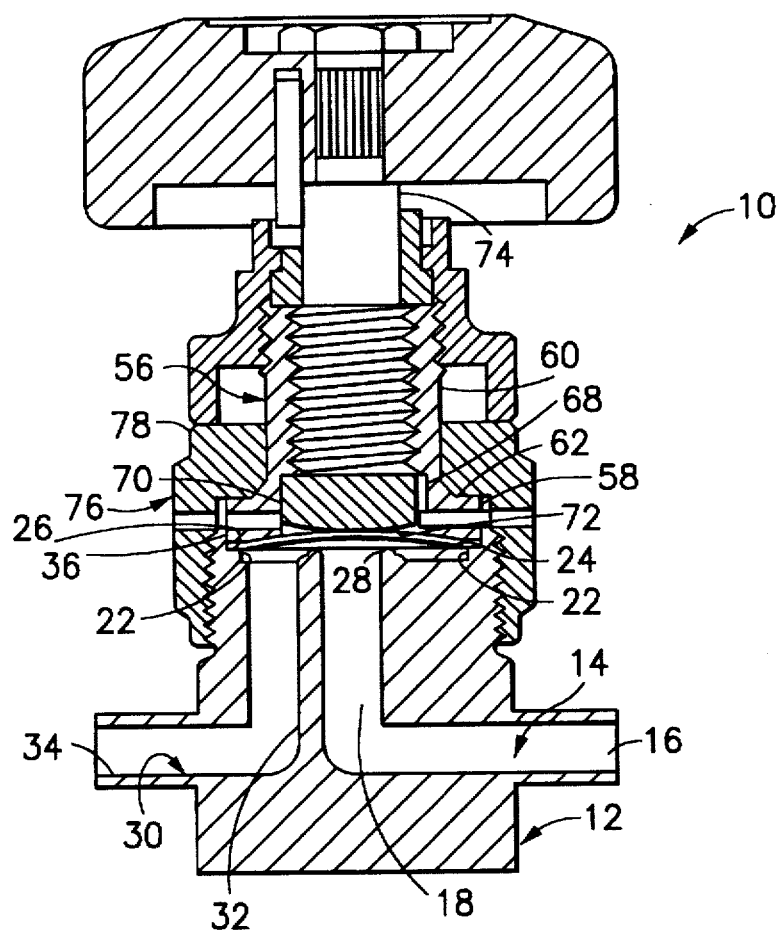
FIG. 1 is a cross-sectional view of a valve in accordance with the subject invention.

A valve in accordance with the subject invention is identified generally by the numeral 10 in FIG. 1. The valve 10 includes a metallic valve housing 12 unitarily molded and/or machined from a metallic material, and preferably from stainless steel. The valve housing 12 includes an inlet passage identified generally by the numeral 14 in FIG. 1. The inlet passage 14 includes orthogonally aligned upstream and downstream segments 16 and 18 respectively. The downstream segment 18 of the inlet passage 14 terminates at a valve chamber 20.

The valve chamber 20 includes a short cylindrical side wall 22 concentric with the downstream segment 18 of the inlet passage 14. The valve chamber 20 is further defined by a generally annular base wall 24 extending inwardly from the side wall 22 toward the downstream segment 18 of the inlet passage 14. The base wall 24 is orthogonal to the axis of the downstream segment 18 of the inlet passage 14 and orthogonal to the side wall 22. An annular diaphragm seat 26 extends radially outwardly from portions of the side wall 22 remote from the base wall 24. The diaphragm seat 26 is concentric with the axis of the downstream segment 18 of the inlet passage 14 and is substantially parallel to the base wall 24 of the valve chamber 20.

A toroidal sealing bead 28 forms the interface between the downstream segment 18 of the inlet passage 14 and the base wall 24 of the valve chamber 20. The toroidal sealing bead 28 effectively defines a semi-circle rotated about the axis of the downstream segment 18 of the inlet passage 14. Inner circumferential portions of the toroidal sealing bead 28 extend continuously and substantially tangentially from the cylindrical side walls defining the downstream segment 18 of the inlet passage 14. The toroidal sealing bead 28 defines a height measured from the base wall 24 substantially equal to the height of the side wall 22. Thus, a plane orthogonal to the axis of the downstream segment 18 of the inlet passage 14 and tangential to the toroidal sealing bead 28 will be coplanar with the diaphragm seat 26.

An outlet passage 30 is formed in the valve housing 12 and extending from the valve chamber 20 to an external location on the valve housing 12. More particularly, the outlet passage 30 includes an upstream segment 32 extending substantially parallel to the downstream segment 18 of the inlet passage 14. The upstream segment 32 of the outlet passage 30 intersects the bottom wall 24 of the valve chamber 20 at a location intermediate the toroidal sealing bead 28 and the side wall 22 of the valve chamber 20. The outlet passage 30 further includes a downstream segment 34 extending substantially colinearly with the upstream segment 16 of the inlet passage 14.

As shown most clearly in FIG. 1, the extreme upstream end of the inlet passage 16 and the extreme downstream end of the outlet passage 30 define nipples to which other pipes or fittings may be connected.

The valve housing 12 is further defined by a short cylindrical diaphragm positioning wall 36 extending concentrically about the axis of the downstream segment 18 of the inlet passage 16. The diaphragm positioning wall 36 defines a diameter substantially equal to the diameter of a diaphragm to be used with the valve 10. The height of the diaphragm positioning wall 36 exceeds the thickness of the diaphragm to be used in the valve 10, as explained further herein.

Outer portions of the valve housing 12 surrounding the valve chamber 20 are formed with an array of external threads for threadedly receiving a bonnet nut as explained further herein.

Figure 4:
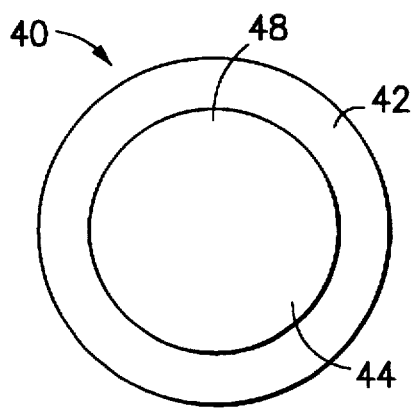
FIG. 4 is a top plan view of the diaphragm.
Figure 5:
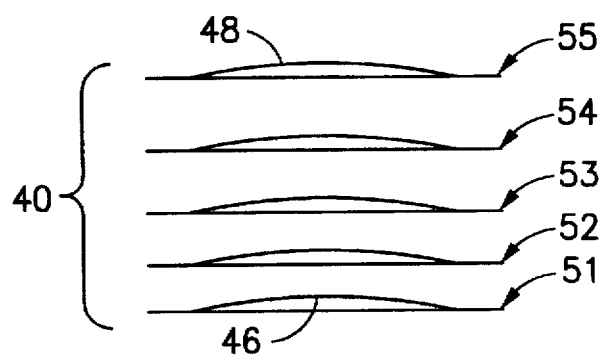
FIG. 5 is an exploded cross-sectional view of the diaphragm shown in FIG. 1.

The valve 10 further includes a metal diaphragm 40 as shown in FIGS. 4 and 5. The diaphragm 40 includes a substantially planar annular peripheral portion 42 and a resiliently dished intermediate portion 44. The planar annular peripheral portion 42 defines a diameter slightly less than the diameter defined by the diaphragm positioning wall 36 of the valve housing 12, and a thickness less than the height of the cylindrical diaphragm positioning wall 36.

Additionally, the planar annular peripheral portion 42 defines an inside diameter adjacent the dished portion 44 of the diaphragm 40 which is approximately equal to the diameter defined by the side wall 22 of the valve chamber 20. Thus, the planar peripheral portion 42 of the diaphragm 40 is positioned on the cylindrical diaphragm seat 26 and within the diaphragm positioning wall 36.

The dished intermediate portion 44 has a concave face 46 and a convex face 48. The diaphragm 40 is oriented such that the concave face 46 of the dished portion 44 faces the valve chamber 20. Conversely, the convex face 48 faces away from the valve housing 12. Thus the concave and convex faces 46 and 48 define inner and outer faces of the valve chamber 20.

As shown most clearly in FIG. 5, the diaphragm is of stacked configuration, and is formed from diaphragm layers 51–55. The layers 51, 53 and 55 are formed from a relatively hard, inert and resilient material, while the layers 52 and 54 are formed from a relatively softer material. In a preferred embodiment, the layers 51, 53 and 55 are formed from a metallic alloy exhibiting a hardness HRC of 45 to 60. The diaphragm layers 51, 53 and 55 preferably are formed from a cobalt chromium-nickel alloy, such as an alloy having 39%–41% cobalt; 19–21% chromium, 14%–16% nickel, 1.5%–2.5% manganese, 0.15 max percent carbon, 0.10 max percent beryllium and iron-balance (about 16%). An example of such an alloy is ELGILOY® which is sold by ELGILOY LP. The layers 52 and 54 of the diaphragm 50 are formed from a softer more malleable metallic material, such as copper, and preferably copper plated with silver.

Returning to FIG. 1, the valve 10 further includes a diaphragm bushing 56 having a large diameter first end 58 and a small diameter second end 60 and a bearing shoulder 62 therebetween. The first end 58 of the bushing 56 defines an outside diameter substantially equal to the diameter of the diaphragm 40. Thus, the large diameter end 58 can be closely received within the diaphragm positioning wall 36. The first end 58 of the bushing 56 includes an end face having a generally planar outer peripheral surface 64 dimensioned for engaging the planar outer peripheral portion 42 of the diaphragm 40. The end face of the bushing 56 further includes a concave central portion 64 which is dished slightly more than the dished portion 44 of the diaphragm 40 to avoid interference therewith. The bushing 56 includes a central aperture 68 extending entirely therethrough. However, portions of the central aperture 68 near the small diameter end 60 are internally threaded. Portions of the central aperture 68 near the large diameter end 58 are not threaded.

A diaphragm actuator 70 is slidably received in the non-threaded end of the central aperture 68. The diaphragm actuator includes a convex actuating face 72 positioned adjacent the convex face 48 of the dished portion 44 on the diaphragm 40.

The valve 10 further includes a threaded valve stem 74 threadedly engaged with the threaded portion of the through passage 68 in the bushing 56. Thus, threaded movement of the valve stem 74 toward the valve housing 12 will urge the convex actuating face 72 of the diaphragm actuator 70 into the convex face 48 of the diaphragm 40, thereby causing a deflection of the diaphragm 40 into the valve chamber 20 as explained further herein. Conversely, threaded movement of the valve stem 74 away from the valve housing 12 will release forces exerted by the diaphragm actuator 70 on the convex face 48 of the diaphragm 40, thereby enabling resilient return of the diaphragm toward an undeflected position as shown in FIGS. 1 and 2.

The valve 10 further includes a bonnet nut 76 threadedly engaged to the threads 38 on the valve housing 12. The bonnet nut 76 includes an inwardly extending flange 78 which surrounds the small diameter portions of the bushing 56, and which engages the shoulder 62 between the small and large diameter portions 60 and 58 of the bushing 56. Thus, threaded tightening of the bonnet nut 76 onto the valve housing 12 tightly urges the large diameter end 58 of the bushing 56 into secure gripping engagement with the diaphragm 40 for tightly securing the planar outer peripheral portion 42 of the diaphragm 40 against the diaphragm seat 26.

Figure 2:
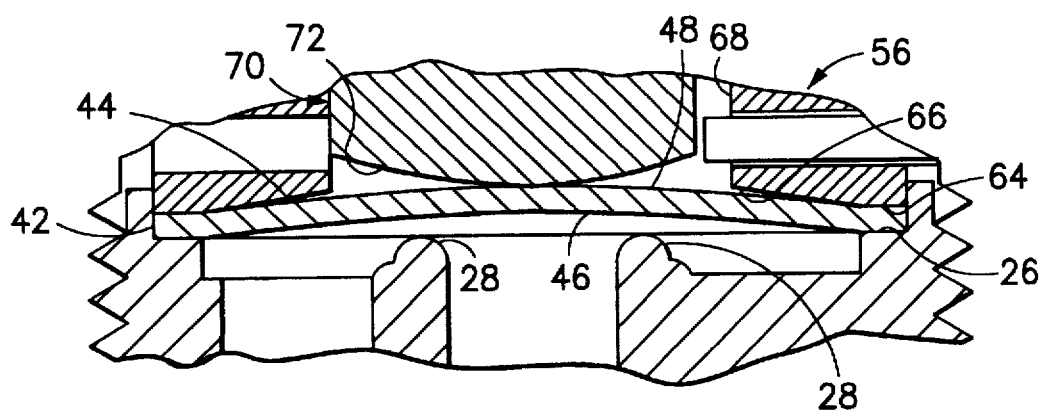
FIG. 2 is an enlarged cross-section showing the valve in the open condition.

As shown in FIGS. 1 and 2, the valve stem 74 is in an unthreaded position relatively remote from the valve housing 12. In this position, the inherent resiliency of the hard metallic alloy layers 51, 53 and 55 of the diaphragm 40 urges the diaphragm actuator 70 upwardly against the end of the valve stem 74 such that a space exists between the toroidal sealing bead 28 and the concave face 46 of the diaphragm 40. Thus, the gaseous fluid flow may proceed without substantial impediment through the inlet passage 14 through the valve chamber 20 and out the outlet passage 30.

Figure 3:
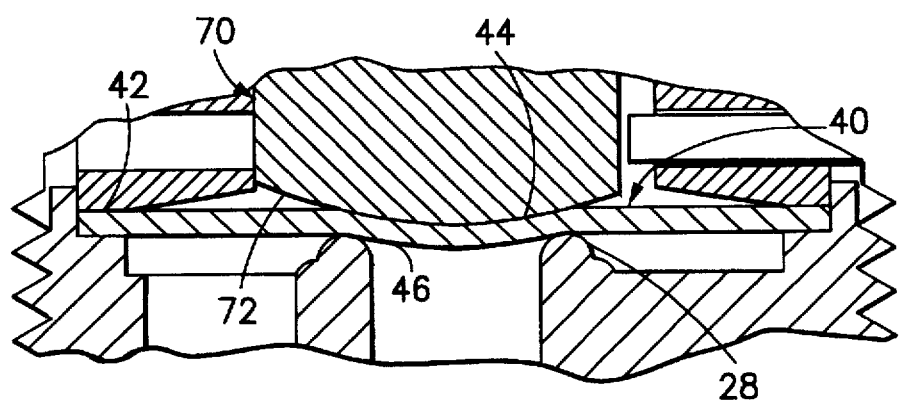
FIG. 3 is a cross-section similar to FIG. 2, but showing the valve in the closed condition.

The valve 10 may be closed by rotating the valve stem 74 for threadedly advancing the valve stem 74 further in the bushing 56 and toward the housing 12. This movement of the valve stem 74 toward the housing 12 will transmit forces to the diaphragm actuator 70. The convex surface 72 of the diaphragm actuator 70 will be urged tightly against the convex surface 48 of the dished portion 44 of the diaphragm 40. These forces will cause the dished portion 44 of the diaphragm 40 to deflect into the orientation shown in FIG. 3. In this configuration, the convex surface 72 of the diaphragm actuator 70 will contact only the central portion of the diaphragm 40, and will urge the centermost regions of the diaphragm 40 beyond the plane extending tangentially across the toroidal sealing bead 28. Thus, central portions of the sealed diaphragm 40 will be deflected to have a slightly concave outer face and a slightly convex inner face. Portions of the diaphragm 40 between the diaphragm seat 26 and the center of the diaphragm actuator 70 will exert significant biasing forces against the toroidal sealing bead 28. These forces will effectively define a circular line of contact at the plane of tangency or slightly inwardly therefrom as shown in somewhat exaggerated form in FIG. 3. These biasing forces will contribute to a high quality seal without the presence of non-metallic materials at the sealing interface.

Opening and closing of the valve 10 will cause the metal diaphragm 40 to seat at substantially the same position on the toroidal sealing bead 28 with virtually no metal-to-metal sliding movement of the diaphragm 40 against the toroidal sealing bead 28. Thus, unlike prior art all-metal valves described above, there is no generation of wear debris that could affect the purity of gases being transported. Furthermore, the very hard alloy of the layers 51, 53 and 55 of the diaphragm 40 exhibit good spring characteristic and resiliency, and thus will exert high sealing forces against the toroidal sealing bead 28. The presence of the softer layer 52 enables the adjacent hard layer 51 to deform slightly into sealing engagement with the toroidal sealing bead 28 despite any microscopic surface irregularities that might exist at the sealing interface.

While the invention has been described with respect to a preferred embodiment, it is apparent that various changes can be made without departing from the scope of the invention as defined by the appended claims. For example, the diaphragm may be formed from fewer or more layers of metal. Additionally, the arrangement of layers of material in the diaphragm may be slightly different from that shown herein. However, the layers of the diaphragm should be arranged to ensure a very hard metallic alloy for engagement with the toroidal sealing bead and a relatively soft layer adjacent to the hard layer. Additionally, the valve housing may take other forms, with different relative positions for the inlet and outlet passages and with other actuating means, including a pneumatic valve actuator rather than the manual handle depicted herein. These and other changes will be apparent to a person skilled in the art after having read the subject disclosure.

What is claimed is:

1. A diaphragm valve, comprising:

a unitary metallic valve housing with an open-sided valve chamber, an inlet passage extending through said valve housing to said valve chamber, said inlet passage having a central axis, an outlet passage extending through said valve housing from said valve chamber, said unitary valve housing being formed to include a toroidal sealing bead in said valve chamber and surrounding said inlet passage, said toroidal sealing bead being defined as a convexly arcuate surface rotated around the central axis of the inlet passage;

a resiliently deflectable metallic diaphragm secured to said valve housing to substantially enclose said open-sided valve chamber, said diaphragm, in an undeflected condition, including a dished portion with a concavely arcuate surface in juxtaposed relationship to said toroidal sealing bead and being spaced from said toroidal sealing bead in said undeflected condition for permitting fluid flow into said inlet passage, through said valve chamber and out of said outlet passage, said diaphragm further including a convexly arcuate surface facing away from said chamber, said diaphragm being formed from a plurality of layers including outer layers of a metallic alloy having a hardness HRC of 45–60, and at least one soft inner layer formed from a metallic material softer than said outer layers; and a valve stem axially aligned with the central axis of the inlet passage and being movable relative to said valve housing, said valve stem including a convex actuator engaging a portion of the convex surface of said diaphragm concentrically with the central axis of the inlet passage, said actuator being dimensioned and configured such that movement of said actuator toward said inlet passage is operative for selectively deflecting said metallic diaphragm into tight sealing engagement with said toroidal sealing bead for interrupting fluid flow into and out of said valve chamber and such that movement of said actuator away from said inlet passage permits said diaphragm to resiliently return to said undeflected condition.

2. The diaphragm valve of claim 1, wherein the outer layers of said diaphragm are formed from a cobalt chromium nickel alloy.

3. The diaphragm of claim 1, wherein said at least one soft inner layer comprises a plurality of soft inner layers, and wherein said diaphragm includes at least one hard inner layer disposed between the soft inner layers, the hard inner layer and the outer layers of said diaphragm are formed from a hard cobalt chromium nickel alloy, and wherein said soft inner layers of said diaphragm valve adjacent said cobalt chromium nickel alloy layers are formed from copper plated with silver.

4. The diaphragm valve of claim 1, wherein said valve stem is configured for engaging only a central portion of said diaphragm aligned with said inlet passage, such that said valve stem is operative for urging portions of said diaphragm through a plane extending tangentially across said toroidal sealing bead, such that said diaphragm is biased against said toroidal sealing bead.

5. A diaphragm valve comprising:

a unitary metallic valve housing having an open-sided valve chamber, inlet and outlet passages extending through said valve housing and communicating with said valve chamber, said inlet passage having a central axis, portions of said valve chamber surrounding said inlet passage defining a toroidal sealing bead concentric with said inlet passage and being defined as a convexly arcuate surface rotated around the central axis of the inlet passage, a diaphragm seat formed in said valve housing and surrounding said valve chamber concentrically with said central axis of said inlet passage, said valve seat defining a plane orthogonal to the central axis of said inlet passage and tangential to said toroidal sealing bead;

a metallic diaphragm secured on said diaphragm seat and extending across said valve chamber, said metallic diaphragm having a central resiliently deflectable dished portion, which, in an undeflected condition defines a concave surface facing said toroidal sealing bead and a convex surface facing away from said valve chamber, said metallic diaphragm being formed from a plurality of metallic layers, including a sealing layer formed from a hard metallic alloy for engagement with said toroidal sealing bead and a metal adjacent said sealing layer softer than said hard metallic alloy; and a convex diaphragm actuator engaged with a location on the convex surface of said diaphragm substantially opposite said inlet passage, said actuator being selectively movable along said central axis and toward said inlet passage for deflecting said diaphragm into tight sealing engagement with said toroidal sealing bead such that central portions of said diaphragm deflect across the plane defined by said diaphragm seat and into regions bounded by said toroidal sealing bead said actuator further being movable away from said inlet passage for permitting said diaphragm to resiliently return toward said undeflected condition.

6. The diaphragm valve of claim 5, wherein said hard metallic alloy of said sealing layer of said diaphragm is a cobalt chromium nickel alloy, and wherein the metal adjacent said sealing layer comprises copper.

7. The diaphragm valve of claim 5, wherein said plurality of metallic layers of said diaphragm comprises three layers of said hard metallic alloy and two layers of said softer metal, said layers of said softer metal being disposed intermediate of and adjacent said layers of said hard metallic alloy.

8. The diaphragm valve of claim 5, wherein said convex diaphragm actuator and said metallic diaphragm are non-rotatable in said valve housing for preventing wiping and generation of wear debris adjacent said diaphragm.

9. A diaphragm valve, comprising:

a unitary metallic valve housing with an open-sided valve chamber, an inlet passage extending through said valve housing to said valve chamber, said inlet passage having a central axis, an outlet passage extending through said valve housing from said valve chamber, said unitary valve housing being formed to include a toroidal sealing bead in said valve chamber and surrounding said inlet passage, said toroidal sealing bead being defined as a convexly arcuate surface rotated around the central axis of the inlet passage;

a resiliently deflectable metallic diaphragm secured to said valve housing to substantially enclose said open-sided valve chamber, said diaphragm, in an undeflected condition, including a dished portion with a concavely arcuate surface in juxtaposed relationship to said toroidal sealing bead and being spaced from said toroidal sealing bead in said undeflected condition for permitting fluid flow into said inlet passage, through said valve chamber and out of said outlet passage, said diaphragm further including a convexly arcuate surface facing away from said chamber, said diaphragm being formed from a plurality of layers including outer layers of a metallic alloy having a hardness HRC of 45–60, and at least one soft inner layer formed from a metallic material softer than said outer layers; and a valve stem axially aligned with the central axis of the inlet passage and being movable relative to said valve housing, said valve stem including a convex actuator engaging a portion of the convex surface of said diaphragm concentrically with the central axis of the inlet passage, said actuator being dimensioned and configured for selectively deflecting said metallic diaphragm into tight sealing engagement with portions of said toroidal sealing bead disposed inwardly from a plane extending tangentially across said toroidal sealing bead, such that said diaphragm is biased against said toroidal sealing bead for interrupting fluid flow into and out of said valve chamber and such that movement of said actuator away from said inlet passage permits said diaphragm to resiliently return to said undeflected condition.

* * * * *